United States Patent [19]

Lemieux et al.

[11] 4,007,257
[45] Feb. 8, 1977

[54] ALKALI METAL HYDRIDE FORMATION

[75] Inventors: Raymond Urgel Lemieux; Emerson Cecil Sanford, both of Edmonton; John Fraser Prescott, Sherwood Park, all of Canada

[73] Assignee: Atomic Energy of Canada Limited, Ottawa, Canada

[22] Filed: Mar. 27, 1975

[21] Appl. No.: 562,807

[52] U.S. Cl. .............................. 423/646; 423/648; 252/188.3 R; 23/290
[51] Int. Cl.² .................... C01B 6/04; C01B 1/02
[58] Field of Search ............... 423/646, 648; 252/188.3 R

[56] References Cited

UNITED STATES PATENTS

| 2,378,368 | 6/1945 | Alexander ......................... 423/647 |
| 3,595,617 | 7/1971 | Vit et al. .......................... 423/646 |
| 3,617,218 | 11/1971 | Van Tamelin et al. ............ 423/647 |

OTHER PUBLICATIONS

Bar–Eli et al., "Journal of the Chemical Soc., " Aug. 1962, pp. 3083–3088.
Jickling, "AECL Res. Eng. (Canada)", Feb. 1971, pp. 2–4.

Primary Examiner—Herbert T. Carter

[57]        ABSTRACT

The present invention relates to a method of producing alkali metal hydrides by absorbing hydrogen gas under pressure into a mixture of lower alkyl mono amines and alkali metal alkyl amides selected from sodium and potassium amides formed from said amines. The present invention also includes purification of a mixture of the amines and amides which contain impurities, such as is used as a catalytic exchange liquid in the enrichment of deuterium, involving the formation of the alkali metal hydride.

15 Claims, 3 Drawing Figures

ALKALI METAL HYDRIDE FORMATION

BACKGROUND OF INVENTION

The present invention relates to the production of alkali metal hydrides. In particular the present invention relates to a process for the production of alkali metal hydrides selected from potassium and sodium hydrides in a simple and economical manner being low cost reagents which process is amenable to operation at low temperatures in a continuous manner. In one particular aspect of the present invention there is provided a method of purifying a catalytic exchange liquid used in the enrichment of deuterium by means of the intermediate production of an alkali metal hydride in accordance with the present invention.

Alkali metal hydrides have great importance in the chemical industry being useful inter alia as reducing agents, as starting materials for the preparation of complex hydrides, as basic catalysts for condensations and as components of catalyst systems for the polymerisation of olefins.

Heretofore alkali metal hydrides have inter alia been prepared from their elements. Methods are also known for preparing the hydrides from their oxides, carbonates, hydroxides, carbides, nitrites and amides. However such processes are relatively expensive, slow, require pure reagents and there is in many cases partial dissociation of the products at the high temperatures involved in their preparation.

SUMMARY OF INVENTION

The present invention provides a process for the production of alkali metal hydrides selected from sodium and potassium hydrides which is simple to operate, which may be operated at ambient temperatures, uses inexpensive reactants and produces a pure product.

It has now been found according to the present invention that alkali metal hydrides selected from sodium and potassium hydrides may be simply and easily prepared, suitably at ambient temperatures, and can be separated in pure form by conventional techniques from a mother liquor produced by the absorption of gaseous hydrogen at elevated pressure into a mixture of lower alkyl mono amines and alkali metal alkyl amides formed from said amines.

According to the present invention therefore there is provided a method of producing an alkali metal hydride selected from sodium and potassium hydrides which comprises absorbing hydrogen at elevated pressure into a mixture of at least one lower alkyl mono amine and an alkali metal alkyl amide of at least one of said amines.

BRIEF DESCRIPTION OF THE DRAWINGS

In the accompanying drawings

It is believed that the reaction which occurs in the process of the present invention proceeds according to the following general equation $$MN\!=\!+ H_2 \rightleftharpoons MH + HN\!<$$

wherein M is the alkali metal and $HN<$ is the amine. In particular in accordance with the present invention it has been found that the alkali metal alkyl amide and hydrogen gas can be brought into equilibrium with solid alkali metal hydride and alkyl amine.

The lower alkyl mono amines contain 1 to 4 carbon atoms preferably 1 to 3 carbon atoms in each alkyl group. More preferably the alkyl group is a methyl group. The mono lower alkyl mono amines are particularly preferred. Methylamine may be particularly mentioned. The alkali metal used to form the hydride is either sodium or potassium. Potassium is particularly preferred for the preparation of potassium hydride using methylamine as the amine. The reaction is believed to proceed according to the following equation $$CH_3NHK + H_2 \rightleftharpoons CH_3NH_2 + KH(s)$$

The potassium hydride as with sodium hydride is precipitated as a finely divided dispersed solid of high purity as can be collected by conventional techniques such as filtration, settling in tanks or trays or centrifugation. The separated hydride may then be washed free of the amine by means of inert solvents including saturated hydrocarbons, dialkylethers, tetrahydrofuran, dioxane and trialkylamines.

The process of the present invention must be operated at elevated hydrogen pressure to obtain absorption of the hydrogen into the mixture and production of the alkali metal hydride. However only moderately high hydrogen pressures are necessary. Towards the higher end of the pressure range the yield of alkali metal hydride is near quantitive.

As will be seen from Example 3, the lower pressure limit for potassium hydride precipitation at $-28°$ C is about 100 p.s.i.; the yield being poor at this pressure. Above 800 p.s.i. hydrogen partial pressure very little improvement in yield is obtained by further pressure increase. Thus the process of the present invention is suitably operated at a pressure above 200 p.s.i. at $25°$ C and preferably 500 to 1500 p.s.i. at $25°$ C.

It will be realized that since the reaction is reversible and favours the formation of the alkali metal alkyl amide at low hydrogen pressures, a suitably high hydrogen overpressure must be maintained during the collection and washing of the precipitated solid alkali metal hydride.

Figure 3:
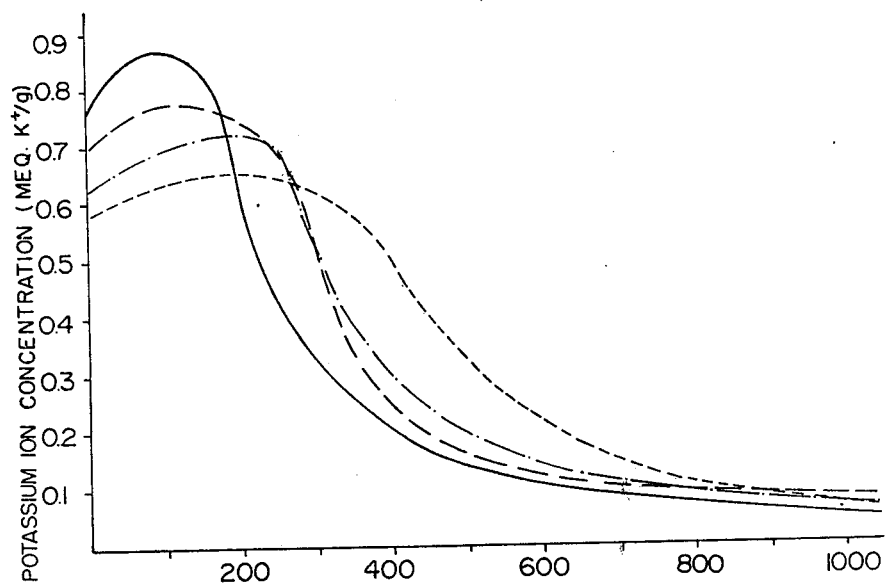
FIG. 3 is a graph depicting solubility of potassium methylamide in methylamine as a function of pressure.

The process of the present invention may be operated at any suitably temperature for as will be seen from FIG. 3 of the following Example 3, the temperature has small effect on the precipitation of the hydride and particularly at pressures around 1000 p.s.i. hydrogen partial pressure there is substantially no effect of temperature. At low pressures e.g. 100 to 300 p.s.i. lower temperatures favour hydride precipitation. The temperature should of course be above the melting point of the amine which is $-92.5$ for methylamine and the upper limit of the temperature is limited to some extent by the thermal stability of the alkali metal alkyl amide/amine solution. Thus for example potassium amide/amine im methylamine has a half life of 5 hours at $100°$ C. Thus the temperature of the process is suitably in the range above about $-80°$ C e.g. up to about $50°$ C and preferably in the range of $0°$ C to ambient temperature.

The concentration of the alkali metal alkyl amide in the amine is not critical and determines the yield of alkali metal hydride. It is generally preferred that the amine solution is saturated with respect to the alkali metal alkyl amide and more preferably that there is excess alkali metal alkyl amide such that it is present in the mixture in solid form whereby the solid alkali metal alkyl amide is converted to solid alkali metal hydride.

As can be seen from FIG. 3 of the following Example 3, the minimum concentration of potassium methylamide in methylamine solution which will precipitate potassium hydride at 1,000 p.s.i. hydrogen partial pressure is 0.1 mmol/g of solution (0.3 mole percent). At this low concentration, the yield is very low. Since the same amount of potassium methylamide will stay in solution at a given pressure regardless of the starting concentration, the higher the initial concentration, the higher the yield in a batch process. The upper concentration limit is usually set at 50 mole percent amide in amine, due to the stoichiometry of the reaction. This is a slurry rather than a solution in most cases, but this is desirable for the process. The concentration of the alkali metal alkyl amide in the amine is suitably 1 to 50 mole percent, and preferably 4 to 30 mole percent metal alkyl amide in amine, depending upon the particular metal and amine being used.

DETAILED DESCRIPTION OF PREFERRED EMBODIMENT

Figure 1:
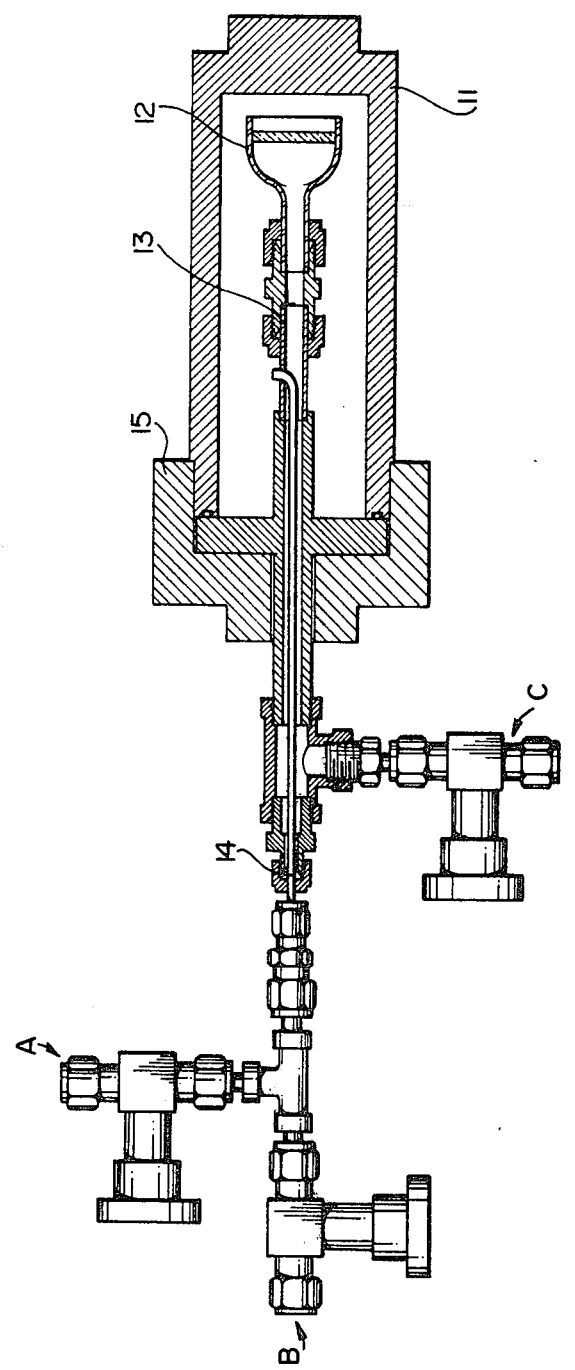
FIG. 1 is a sectional view of a pressure apparatus for carrying out the reaction.
Figure 2:
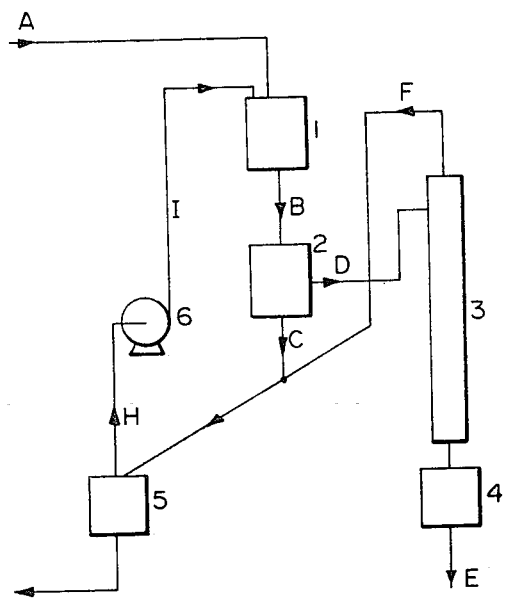
FIG. 2 is a schematic flowsheet utilizing the reaction for regenerating a catalytic exchange liquid.

The present invention will be further illustrated by way of the following examples in conjunction with FIGS. 1 to 3 of the accompanying drawings in which FIG. 1 is a sectional view through an apparatus used in the process of the Example 1. FIG. dip-pipe is a schematic representation of apparatus for use in regenerating a catalytic exchange liquid for deuterium enrichment in accordance with a further aspect of the present invention and FIG. 3 is a graph showing the solubility of potassium methylamide in methylamine as a function of hydrogen partial pressure.

EXAMPLE 1

A full opening 300 ml 316 SS autoclave 11 was modified (FIG. 1) so that potassium methylamide solution and n-hexane washes could be introduced into the autoclave 11 without passing through the fine sintered glass filter 12 attached to the dip-pipe 13.

Potassium methylamide solution (0.50 mmole/g of solution, 130ml–86.5g) containing 43 mmol of potassium methylamide was charged through the one-eighth inch O.D. tube 14 through connection A after evacuation of the autoclave 11 through C and refilling with hydrogen to a pressure of 30 p.s.i.g. The autoclave 11 was then pressured at room temperature to 1008 p.s.i.g. with hydrogen. On shaking the pressure fell to 914 p.s.i.g. The pressure was restored to 1,000 p.s.i.g. and again hydrogen absorption reduced the pressure to 986 p.s.i.g. (about one hour). The autoclave pressure was raised to 1,000 p.s.i.g. and left overnight; the pressure fell to 984 p.s.i.g. No leaks were detected in the system. The total pressure drop in a free space of 200 ml (system volume 330 ml) was equivalent to the absorption of 70 mmol of hydrogen.

The reaction autoclave 11 was connected to a filtrate receiver (not shown) which was then pressured to 875 p.s.i.g. with hydrogen. The reaction mixture was filtered by blowing the liquor through the glass filter 12, up the annular space and through connection B to the receiver. The required differential pressure was obtained by adding hydrogen to the reaction autoclave 11 or removing hydrogen from the receiver. The residue remaining in the reaction autoclave was washed with n-hexane (3 × 100 ml) in the same way. Differential pressures of up to 75 p.s.i. were required when the washes were being blown through the occluded filter. The total system pressure was maintained between 700 and 1,100 p.s.i.g. during the filtration and washing.

The reaction autoclave 11 was disconnected, vented and the residual solvent (13 g) removed by vacuum transfer. The residue was pumped under vacuum for one hour to remove last traces of solvent. The autoclave 11 was pressured to 30 p.s.i.g. with argon, the full opening top 15 loosened and the product transferred to glass ampoules for chemical analysis and three Debye-Scherrer powder X-ray tubes filled. Similar samples of authentic potassium hydride were made up for comparative analysis. All data clearly indicated that the residue was potassium hydride with no detectable quantity of crystalline impurity.

EXAMPLE 2

A sample of potassium methylamide solution in methylamine, containing 43 mmol of potassium methylamide, was subjected to a hydrogen partial pressure of 950 p.s.i. at 25° C in an autoclave containing an internal filter at the bottom of a dip-pipe. The bulk of the mother liquid was drawn off through the filter and dip-pipe at the reaction pressure of 1,000 p.s.i.g. leaving the precipitate in the autoclave. The residue was washed three times with n-hexane and, after distilling out residual wash liquor, pumped under vacuum to remove the last traces of solvent. The autoclave was opened in an argon atmosphere and the solid (1.4 g = 35 mmol) removed. A sample of the solid was submitted for X-ray powder diffraction analysis; comparison with an authentic sample of postassium hydride showed that the solid precipitated from a solution of potassium methylamide in methylamine was potassium hydride. Any impurities present were either non-crystalline or present in insufficient quantity to be detected.

EXAMPLE 3

The solubility of potassium methylamide in methylamine was determined with increasing hydrogen partial pressure at temperatures of −28°, 0°, 25° and 50° C in order to demonstrate the effect of temperature and pressure on the precipitation of potassium hydride from these solutions. The results obtained are shown in FIG. 3.

EXAMPLE 4

A solution of sodium methylamide in methylamine (0.26 meq Na/g) was subjected to 1,000 p.s.i. in hydrogen partial pressure and filtered at room temperature after equilibration. The filtrate contained 0.07 meq Na/g showing that 0.19 meq Na/g had been precipitated as sodium hydride.

$$NaHNCH_3 + H_2 \rightleftharpoons NaH\downarrow + H_2NCH_3$$

The process of the present invention in producing a pure alkali metal hydride and in being reversible has particular application in accordance with a particular aspect of the present invention to the purification of mixtures of alkali metal alkyl amides in amines containing impurities, particularly those used as catalytic exchange liquids in the enrichment of deuterium. Such exchange liquids are desirably pure but due to thermolysis during the deuterium enrichment process become contaminated with thermal decomposition products. For example the enrichment of deuterium by the hydrogen → potassiumm methylamide-methylamine process leads to slow decomposition of the potassium methylamide catalyst to a number of products especially to N,N'-dimethylformamidine. The decomposition products must be removed during the operation of the process so as to keep a suitable level of catalysis. The impure mixture in accordance with the present invention can be subjected to a hydrogen overpressure to precipitate alkali metal hydride in pure dispersed solid form which may be isolated from the mother liquor and mixed with pure amine to regenerate the alkali metal amide and release hydrogen and thus provide a purified mixture. The pure amine may be obtained by purification, suitably by distillation, of the amine in the mother liquor from which the alkali metal hydride has been separated. Thus, in the case of the aforesaid impure potassium methylamide in methylamine catalytic exchange liquid, by removing a portion of the catalytic solution and exposing it to high hydrogen overpressure, the potassium methylamide reacts and is precipitated in the form of finely divided dispersed potassium hydride which is collected preferably by centrifugation at about 1,000 p.s.i. hydrogen pressure. The hydrogen pressure is reduced and the methylamine is stripped from the mother liquor to leave a residue of the products of decomposition, and the methylamine is returned to the solid potassium hydride. The methylamine reacts with the potassium hydride to form potassium methylamide which is used to replenish in part the catalyst lost by decomposition in the deuterium enrichment process.

In particular referring to FIG. 2 a catalytic solution purge stream (A) from the deuterium enrichment process containing potassium methylamide and its thermal decomposition products, primarily the potassium salt of N,N'-dimethylformamidine, in solution in methylamine is contacted with hydrogen at a high pressure (I) in the reaction vessel 1. The resulting slurry (B) of solid potassium hydride in a solution of the decomposition products is filtered in the pressure filter 2. The filtrate (D) is introduced into a fractional distillation column 3 and a concentrated solution of the decomposition products (E) withdrawn from the re-boiler 4. The methylamine distillate (F) is used to back-wash the filter 2 and transport the solid potassium hydride as a slurry to the regeneration vessel 5. Hydrogen released by reaction of the solid potassium hydride with methylamine at low pressure it withdrawn from the regeneration vessel 5, compressed to the required high pressure in the compressor 6 and recycled (I) to the hydride precipitation stage in the reaction vessel 1. A solution of essentially pure potassium methylamide in methylamine (G) is withdrawn from the regeneration vessel 5 and returned to the deuterium enrichment process. The process is self-sufficient in hydrogen and may be operated as a continuous, semi-continuous or batch process as desired.

This aspect of the present invention is shown in the following example.

EXAMPLE 5

Recovery of Potassium Methylamide from Solutions Containing Thermal Decomposition Products A plurality thermolyzed potassium methylamide solution containing 0.26 mmol/g of solution of potassium methylamide and 0.20 mmol/g of solution of the potassium salt of N,N'-dimethylformamidine was subjected to a hydrogen partial pressure of 1,000 p.s.i. and filtered. The filtrate contained essentially all the potassium salt of N,N'-dimethylformamidine (0.21 mmol/g of solution) and about 40 per cent of the potassium methylamide (0.11 mmol/g of solution). The solid potassium hydride collected in the filter was dissolved in methylamine (55 g) and the hydrogen produced released. The resulting potassium methylamide solution contained 60% of the potassium methylamide present in the original mixture and only a trace of decomposition products; the regenerated solution had a purity of 93 mole percent.

The purity of the recovered potassium methylamide solution may be improved even further by washing the precipitated potassium hydride e.g. with pure methylamine. The recovery of undecomposed potassium methylamide may be increased by either concentrating the partially thermolyzed solution before applying a hydrogen partial pressure or by applying a higher hydrogen partial pressure.

The process of the present invention in involving a reversible reaction has particular application in accordance with a further aspect of the present invention with the storage of hydrogen gas as hydride under pressure in the amine-hydride mixture such that the hydrogen gas is readily recoverable for use.

Having thus described the invention, what is claimed is:

1. A method of producing an alkali metal hydride selected from sodium and potassium hydride which comprises admixing hydrogen at an elevated pressure of 200 to 1,500 psi and a temperature of from −80° C to 50° C with a mixture of at least one lower alkyl mono-amine having 1 to 4 carbon atoms in each alkyl group and an alkali metal alkyl amide of at least one of said amines, the concentration of alkali metal alkyl amide in the amine being at least 0.3 mole percent to cause absorption of hydrogen in said mixture and precipitating alkali metal hydride in said amine mixture and separating the alkali metal hydride so formed from the amine mixture.

2. A method as claimed in claim 1 in which the reactant mixture contains impurities and in which the separated alkali metal hydride is admixed with purified amine at low hydrogen pressure to regenerate a mixture of said amine and amide.

3. A method as claimed in claim 2 in which the purified amine is obtained by distillation of said mother liquor.

4. A method as claimed in claim 3 in which the reactant mixture is a catalytic exchange liquid used in the enrichment of deuterium and containing thermal decomposition products whereby the catalytic exchange liquid is purified for reuse in said enrichment of deuterium.

5. A method as claimed in claim 1 in which the lower alkyl mono amine has 1 to 3 carbon atoms in each alkyl group.

6. A method as claimed in claim 1 in which the amine is methyl amine and the amide is potassium methyl amide.

7. A method as claimed in claim 1 in which the amine is methyl amine and the amide is sodium methyl amide.

8. A method as claimed in claim 4 in which the catalytic exchange liquid is a solution of potassium methyl amide in methyl amine and containing the potassium salt of N,N'-dimethylformamidine as impurity.

9. A method as claimed in claim 1 in which the alkali metal is potassium.

10. A process as claimed in claim 1 in which the reaction temperature is from −28° C to 50° C.

11. A method as claimed in claim 1 in which the hydrogen partial pressure is 500 to 1,500 p.s.i.

12. A method as claimed in claim 1 in which the reaction temperature is from 0° to 50° C.

13. A method as claimed in claim 1 in which the alkali metal alkylamide concentration in the amine is from 1 to 50 mole percent.

14. A method as claimed in claim 1 in which the mixture is saturated with said alkali metal alkylamide with excess undissolved alkali metal alkylamide present.

15. A method of storing hydrogen which comprises admixing hydrogen at an elevated pressure of 200 to 1,500 psi and a temperature of from −80° C to 50° C with a mixture of at least one lower alkyl mono amine having 1 to 4 carbon atoms in each alkyl group and an alkali metal alkyl amide of at least one of said amines, the concentration of alkali metal alkyl amide in the amines being at least 0.3 mole percent to cause absorption of hydrogen in said mixture and precipitating alkali metal hydride in said amine mixture and maintaining said pressure to effect the hydrogen storage whereby on release of said pressure said hydrogen may be recovered for use thereof.

* * * * *